United States Patent
Sexton et al.

(10) Patent No.: US 7,158,995 B2
(45) Date of Patent: Jan. 2, 2007

(54) METHOD FOR MANAGING POINTERS TO EXTERNAL OBJECTS IN A RUN-TIME ENVIRONMENT

(75) Inventors: Harlan Sexton, Palo Alto, CA (US); David Unietis, San Francisco, CA (US); Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 10/406,787

(22) Filed: Apr. 3, 2003

(65) Prior Publication Data

US 2003/0212656 A1    Nov. 13, 2003

Related U.S. Application Data

(60) Provisional application No. 60/378,391, filed on May 8, 2002.

(51) Int. Cl.
*G06F 17/00*    (2006.01)

(52) U.S. Cl. .............................. 707/103 Y; 707/103 Z; 707/206; 707/104.1; 707/103 X; 703/1; 703/6; 703/7; 703/13; 718/104; 719/316

(58) Field of Classification Search .............. 707/1–10, 707/101–103, 205; 703/1, 6, 7, 13; 718/104; 719/316

See application file for complete search history.

(56) References Cited

U.S. PATENT DOCUMENTS

| | | | |
|---|---|---|---|
| 5,870,753 A | 2/1999 | Chang et al. | |
| 5,987,242 A * | 11/1999 | Bentley et al. | 703/13 |
| 6,023,711 A * | 2/2000 | Bennett et al. | 707/205 |
| 6,063,128 A * | 5/2000 | Bentley et al. | 703/6 |
| 6,230,213 B1 * | 5/2001 | Davidson | 719/316 |
| 6,253,226 B1 * | 6/2001 | Chidambaran et al. | 718/104 |
| 6,564,223 B1 * | 5/2003 | Sexton et al. | 707/103 Y |
| 6,584,612 B1 | 6/2003 | Mueller et al. | |

OTHER PUBLICATIONS

Java (TM) Remote Method Invocation (RMI), Oct. 1998.*

* cited by examiner

*Primary Examiner*—Khanh B. Pham
*Assistant Examiner*—Emeka Ebirim
(74) *Attorney, Agent, or Firm*—Hickman Palermo Truong & Becker LLP

(57) ABSTRACT

A method and software for managing pointers to external objects in a run-time environment are described in which eager external references are provided that allow session memory objects to point directly to certain call memory objects with machine pointers. The eager external references contain enough information to recreate the call memory objects in call memory at the beginning of the call and fix the session memory objects to point to the new locations of the recreated call memory objects.

16 Claims, 4 Drawing Sheets

METHOD FOR MANAGING POINTERS TO EXTERNAL OBJECTS IN A RUN-TIME ENVIRONMENT

RELATED APPLICATIONS

The present application claims the benefit of U.S. Provisional Patent Application Ser. No. 60/378,391 filed on May 8, 2002, the contents of which are hereby incorporated by reference.

FIELD OF THE INVENTION

The present invention relates to computer systems and more particularly to a method for managing pointers to external objects in a run-time environment.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment. Many dynamic run-time environments create objects that last as long as the objects are being referenced by a program, and these objects are deallocated when they are no longer referenced through a procedure known as garbage collection.

In run-time environments that permit multiple users to connect in separate, concurrent sessions to a server system, scalability in terms of the number of simultaneous users who can establish separate sessions is very important. User scalability is primarily constrained by the size of the memory footprint that each session consumes. For example, a server system may have 100 Mb of memory for supporting all the user sessions. If the session memory footprint is 1 Mb, then only 100 users can be supported at one time; however, if the session memory requirements can be dropped to 500 Kb, a total of 200 user sessions can now be supported. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time when the user is actively using the server, such as a transaction in a database server. Accordingly, those objects that do not need to live beyond the duration of the call are placed in the call memory rather than session memory. When the call is completed, objects in the call memory are deallocated and the call-duration memory is reclaimed for us. This approach has been implemented in Oracle Corporation's PL/SQL™ language, for instance, in which objects are explicitly declared as having the duration of a call or of a session. Memory management in such a language is straightforward because the objects are simply allocated in the memory that corresponds to their duration.

The JAVA™ programming language, however, defines the lifetime of many objects, especially system objects, to extend throughout the duration of a session and does not have the notion of a call or call memory. One approach is to allocate objects initially in call memory, and at the end of the call migrate the objects that are still alive into session memory. Some of these objects, however, are infrequently used and have been dynamically loaded from disk. These external objects consume session memory and reduce the user scalability of the database system.

Therefore, there is a need for improving the user scalability of a relational database system implementing a run-time environment for handling database applications. A need exists for reducing the session memory footprint consumed by infrequently used objects in a run-time environment. There also exists a need for resolving external references to objects without wasting session memory.

SUMMARY OF THE INVENTION

These and other needs are addressed by the present invention by providing eager external references that allow session memory objects to point directly to certain memory objects in a memory potentially shorter than session memory with machine pointers but contain enough information to recreate the shorter-duration memory objects at the beginning of the call and fix the session memory objects to point to the new locations of the recreated objects in the potentially shorter-duration memory. Thus, session memory is reduced because these memory objects are not migrated to session memory, but are merely reinstantiated each time in the shorter-duration memory at the beginning of a database call.

Accordingly, one aspect of the invention relates to method and software for managing a pointer in a first memory (e.g. session memory) that assigned to an object activated in a second memory, in which the second memory has a duration shorter than the first memory. In this method, an external reference object is accessed, in which the external reference contains a reference to the pointer in the first memory and a reference to a descriptor for activating the object. The object is reactivated in the second memory based on the descriptor, and the pointer in the first memory is reassigned to point to the reactivated object in the second memory based on the reference to the pointer.

Another aspect of the invention pertains to a method and software for managing a pointer in a session memory assigned to an object activated in a shorter-duration memory, where the shorter-duration memory may be deallocated before the beginning of a subsequent database call. At the beginning of the subsequent database call, the shorter-duration memory is reallocated, the object is reactivated in the reallocated shorter-duration memory, and the pointer in the session memory is reassigned to point to the reactivated object in the reallocated shorter-duration memory.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for managing pointers to external objects in a run-time environment are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this memory model.

Figure 1:
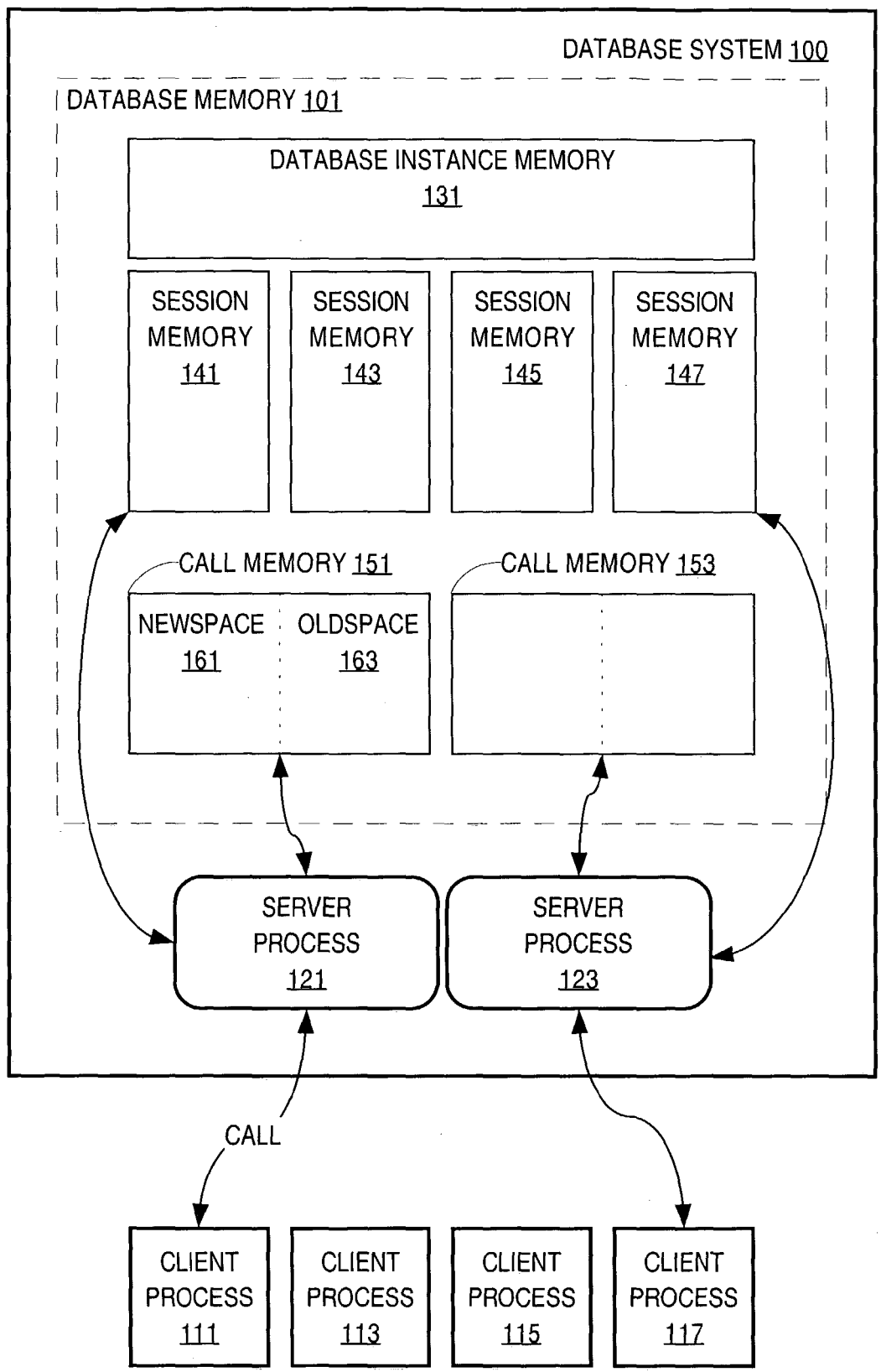
FIG. 1 schematically illustrates a memory model for multi-user database system with which an embodiment of the present invention can be deployed.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, and call memories 151 and 153. It is to be understood that the number of the session memories and call memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

External Objects

Since session memory is allocated for each active client session, user scalability is improved by reducing the memory requirements of session memory. In accordance with one aspect of the invention, the memory requirements for session memory are reduced by keeping some long-living objects in call memory and recreating the objects in call memory before they are used in a subsequent call.

Commonly-assigned U.S. patent application Ser. No. 09/408,847 entitled METHOD AND ARTICLE FOR MANAGING REFERENCES TO EXTERNAL OBJECTS IN A RUN-TIME ENVIRONMENT in re Sexton et al. describes one mechanism for keeping long-living objects in a call memory by deferring the allocation of objects in call memory until those external objects are actually accessed. This approach employs lazy evaluation for resolving external objects, and by creating external numeric references to the external objects, such that when the external numeric reference is dereferenced.

In accordance with this approach for the lazy evaluation of external references, a stub object for the external object is created in session memory. The stub object includes a "descriptor," which is a group of data that identifies the external object and is sufficient to create or recreate the external object. Typically, the descriptor is a string that names to the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and generally is written specifically for that external object or for external objects belonging to a particular class.

When a pointer to the stub object is assigned to a slot in an object, for example during initialization of the object, a run-time external reference is generated based on the pointer to the stub object and stored in the slot instead of the pointer to the stub object. A run-time external numeric reference is a reference to an external object, such that dereferencing the run-time external numeric reference causes the external object to be loaded into virtual memory, if the external object is not currently loaded. In this embodiment, the run-time external reference is implemented as a tagged numeric reference, in which the tag bits indicate that the numeric reference is an external numeric reference and other the non-tag bits of the external reference indicates an index into a descriptor array and a value array. The value array stores pointers to objects in call memory that have been activated; if the entry in the value array corresponding the index is null, then the corresponding descriptor, found by indexing the descriptor array, is used to activate the object in call memory and the address of the activated object is cached in the value array. Accordingly, in this approach, long-living objects are recreated in call memory as when the external numeric reference is dereferenced.

Eager External References

In the above-described, external numeric references are distinguished from other references in session memory by a tag value, and therefore requires first checking the tag bits, determining whether the tag bits indicate an external numeric reference, and then executing the steps of dereferencing the external references by first finding the values array and indexing into the values array. Accordingly, any time a reference in session memory is dereferenced there is a run-time check for an external reference, which imposes a small amount of run-time overhead.

This small amount of run-time overhead nevertheless may be too expensive in some implementation environments where performance is at a premium. Accordingly, one approach can be adopted in which, for performance reasons, all references in at least some if not most session memory objects are implemented as machine pointers, even for references to objects in call memory or other memories who lifetimes is potentially shorter than a session. Usually, the references from session memory objects to call memory objects will expire before the end of the call (and references to other shorter-duration memories may expire before a subsequent call) and be garbage collected or will survive to the end of the call and be migrated into session memory. For certain large, recreatable objects in call memory, on the other hand, it is desirable, not to migrate them to session memory and thereby increase the session memory footprint and reduce scalable, but to recreate them in a shorter-duration memory in a subsequent call.

There is a difficulty combining the session memory machine pointer approach with the use of external, recreatable objects in a potentially shorter—duration memory—in a subsequent call, the object could get recreated (or reactivated) at a different address in the shorter-duration memory. As a result, the session memory machine pointer, which was pointing to the old location of the object, is no longer necessarily pointing to the correct address of the object after it was reactivated in the shorter-duration memory. In cases where it is possible to predict whether a session memory object can point to such recreatable objects, one could adopt a dual format approach in which those objects that are known to point to external objects would use tagged external numeric references but those objects that are known not to point to such recreatable external objects can use pure machine pointers. This dual approach, however, breaks down when there are objects, especially in hot-loaded classes, where is not known statically whether they would point to such recreatable objects. Adopting a conservative assumption (i.e., that they may point to such recreatable objects) results in incurring the run-time overhead of the external numeric reference approach.

Figure 2:
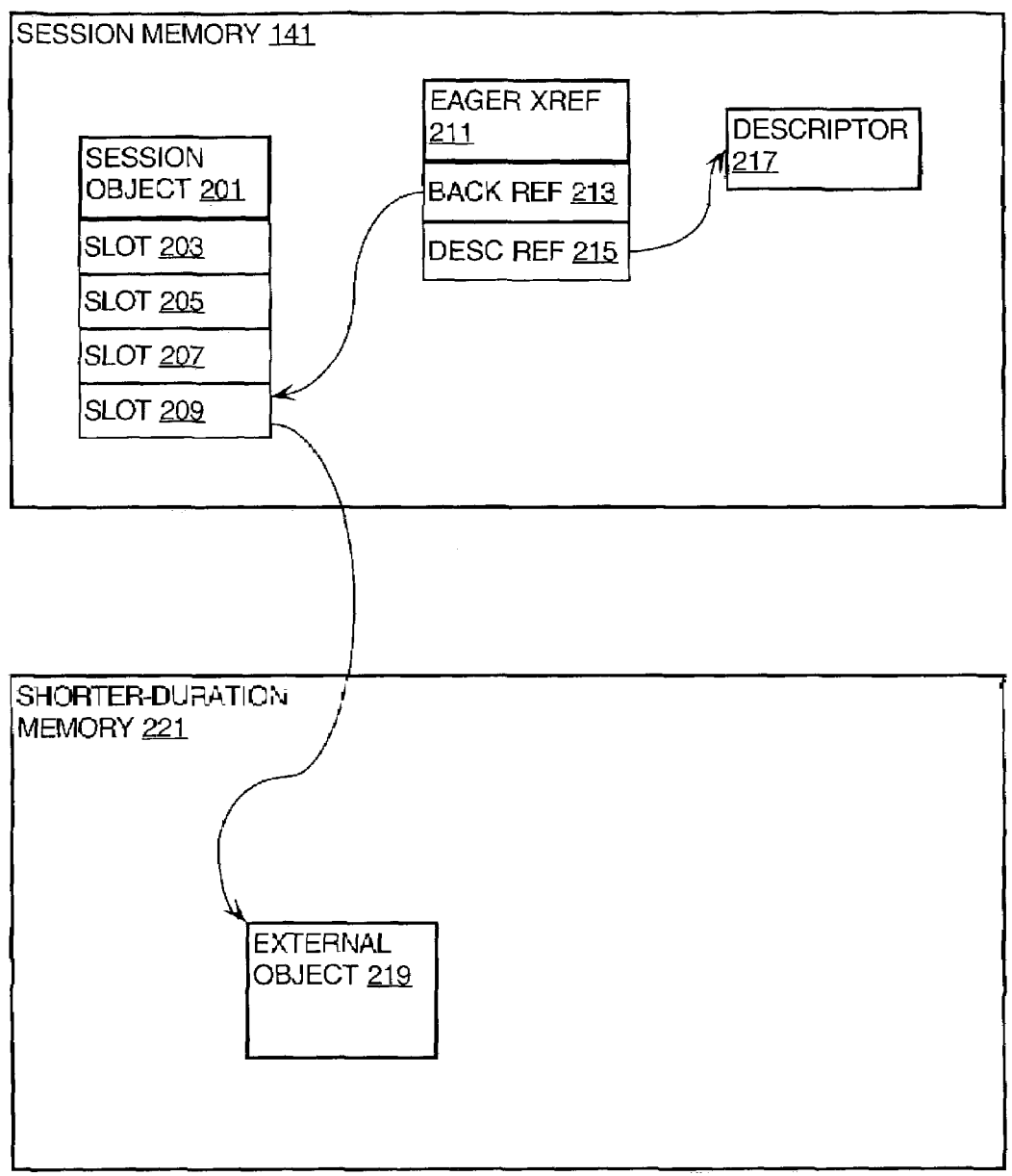
FIG. 2 illustrates an exemplary memory configuration in accordance with an embodiment of the present invention.

Accordingly, one aspect of the invention relates to the use of an eager external reference that allows session memory objects to point to recreatable objects in a shorter-duration memory, but at the beginning of the next call have enough information to recreate the objects and patch the old session memory pointers so that they would point to the correct place. FIG. 2 illustrates an exemplary configuration that includes a session memory 141 and a shorter-duration memory 151. Session memory 141 includes a session object 201 that contains number of slots 203, 205, 207, and 209. One of the slots holds a machine pointer 209 that points to a recreatable object 219 in shorter-duration memory 151. The shorter-duration memory 151 can be a recreatable shared state whose lifetime is potentially shorter than a session, or alternatively, call memory 151.

In this configuration, an eager external reference (XREF) 211 in session memory 141 is provided that contains a back reference (BACK REF) 213 and a descriptor reference (DESC REF) 215. Although only one eager external reference 211 is shown in FIG. 2, there may be a plurality of such eager external references, which may be kept in an aggregate data structure such as an array that is known to the memory management system and can be iterated through at the beginning of a call. The back reference 213 points to the session memory pointer 209 that points to the external object 219 and therefore identifies the session memory pointer 209 that needs to be patched at the beginning of the call. The descriptor reference 215 points to a descriptor 217 that is used to activate the external object 219.

Managing Pointers to External Objects

Figure 3:
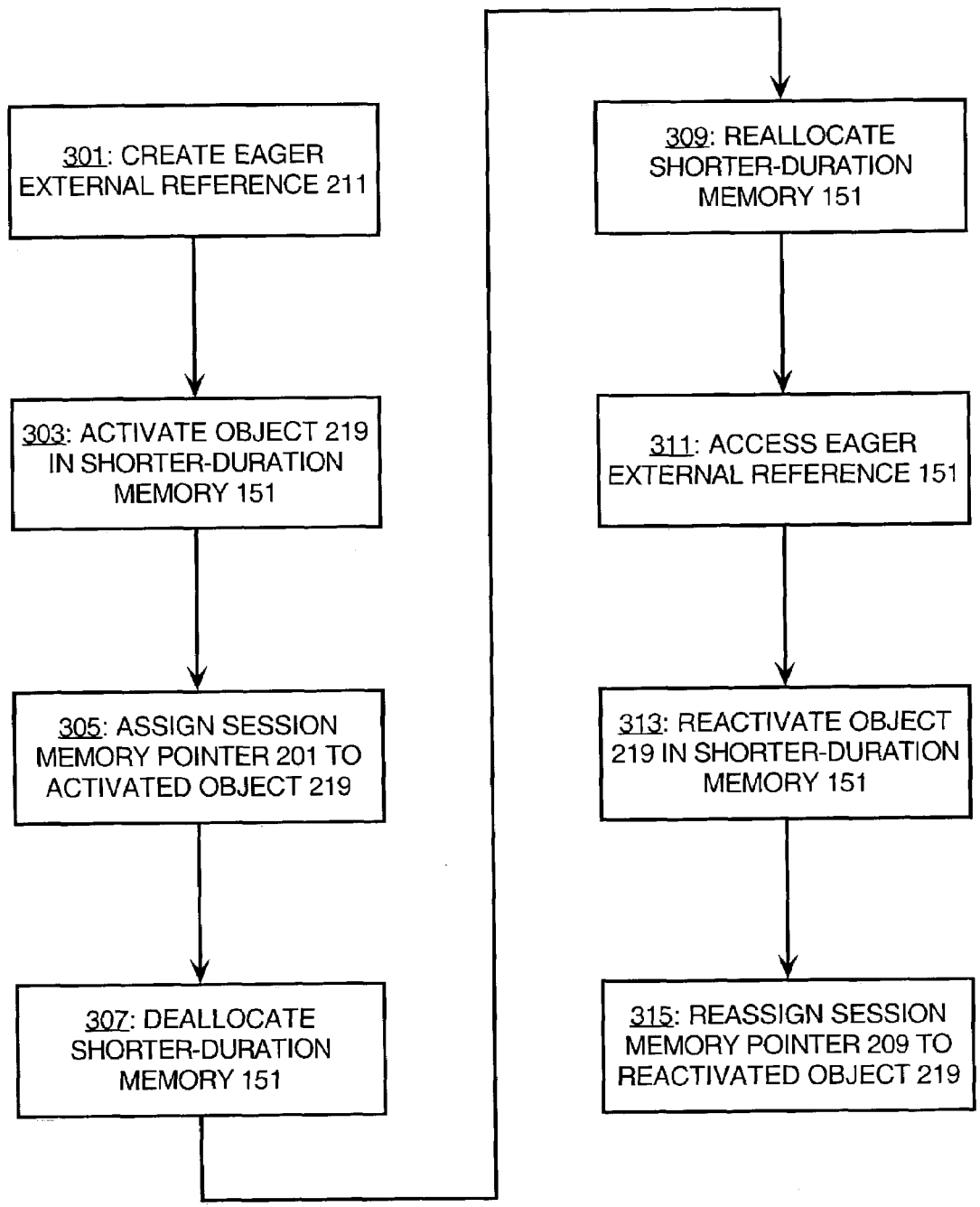
FIG. 3 illustrates how an eager external reference can be used to manage pointers to external objects according to an embodiment of the present invention.

FIG. 3 illustrates how the eager external reference 211 can be used to manage pointers to external objects. At step 301, the eager external reference 211 is created when a session memory pointer 209 in a slot of a session memory object 201 is assigned to point to the external object. This may occur when the session memory pointer 209 is assigned to point to an activatable stub object. The eager external reference 211 is initialized so that the back reference 213 points to the session memory pointer 209, and the descriptor reference 215 is initialized to point to the descriptor 217.

At step 303, the external object 219 is activated in shorter-duration memory 221. Specifically, memory in shorter-duration memory 221 is allocated for the external object 219 a realize routine is invoked that uses the descriptor 217 to initialize the allocated memory. After the external object 219 has been activated in shorter-duration memory 221, the session memory pointer 209 is then assigned to point to the external object 219 (step 305).

At the end of the call, most objects in call memory 151 are either garbage collected if they are no longer used or are migrated to session memory 141 is they are still being referenced by a session memory object. Recreatable objects, however, even though still referenced are not migrated to session memory 141 to keep the session memory footprint small and user scalability high. Accordingly, such recreatable objects are kept in a memory whose lifetime is potentially shorter than a session. If kept in call memory 151, they are simply deallocated at the end of the call when the call memory 151 itself is deallocated; if kept in a non-call memory they may be deallocated when the non-call memory is deallocated some before the beginning of a subsequent call (step 307).

At the beginning of the next call, the call memory 151 is reallocated and the shorter-duration memory 221 may have been reallocated (step 309), at which point, the eager external references 211 are accessed to recreate the external objects in shorter-duration memory 221 (step 311). Specifically, the descriptor reference 215 is used to reactivate the external object 219 in the shorter-duration memory 221 by invoking the appropriate realize routine on the descriptor 217 (step 313). After the external object 219 has been reactivated in shorter-duration memory 221, the back reference 213 is used to identify the session memory pointer 209 that needs to be patched and the identified session memory pointer 209 is updated to point to the new address of the external object 219 in shorter-duration memory 221 (step 315). Accordingly, the next time that the session memory pointer 209 is dereferenced, it is already pointing to the correct location in shorter-duration memory 221.

Hardware Overview

Figure 4:
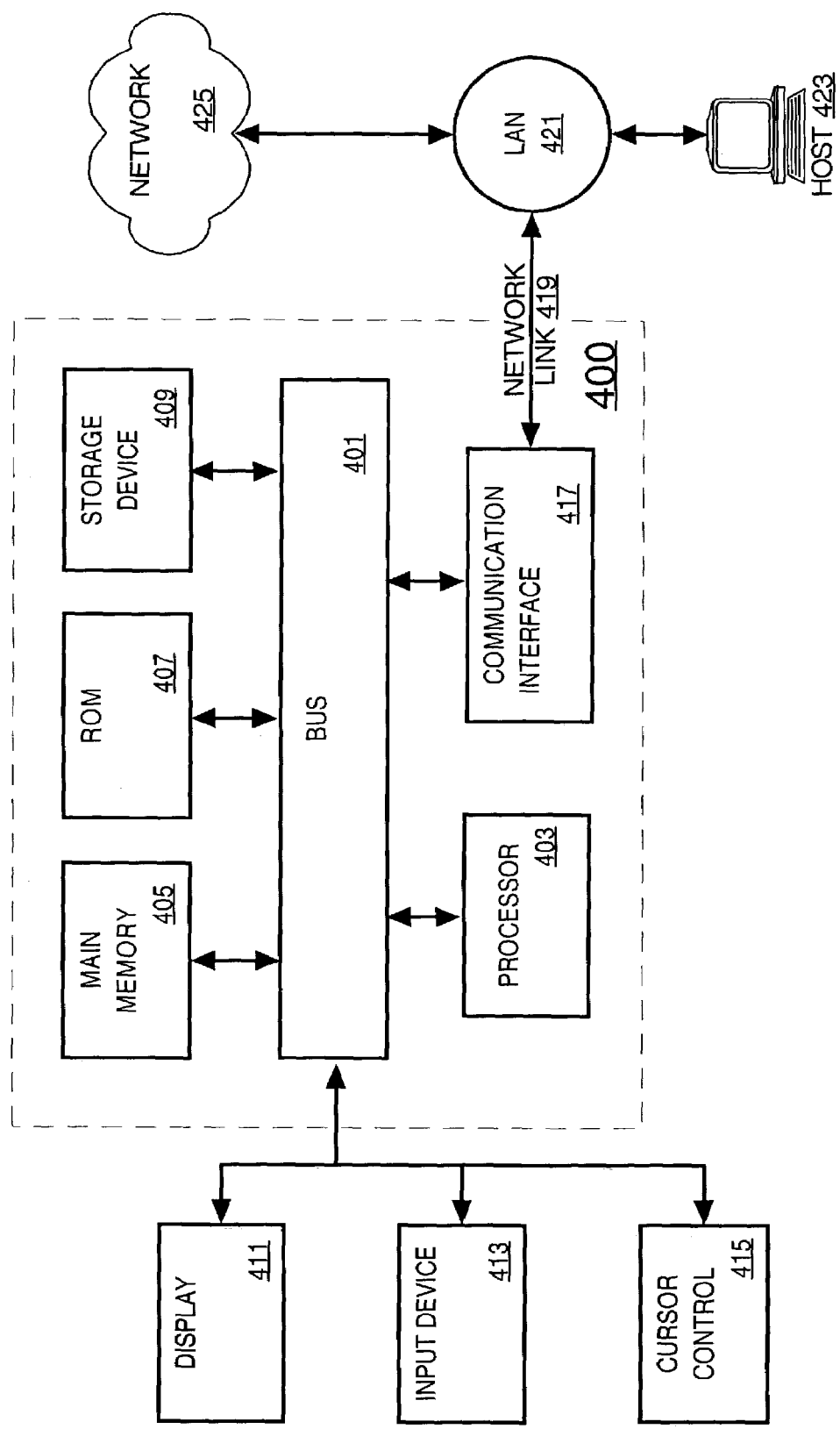
FIG. 4 depicts a computer system that can be used to implement an embodiment of the present invention.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, managing pointers to external objects in a run-time environment is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the present invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 405 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

"Virtual memory" refers to memory addressable by a storage allocation technique in which auxiliary storage, such as memory in storage device 409, can be addressed as though it were part of the main memory 405. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 405.

On many operating systems, a process will utilize a certain amount of virtual memory that no other user process may access in order to provide data security. "Shared memory" refers to the virtual address space on the computer system 400 that is concurrently accessible to a plurality of executing user processes on a processor 403. In some embodiments, shared memory is also accessible to executing user processes on a plurality of processors.

"Secondary storage" as used herein refers to storage elements, other than virtual memory, accessible to a process. Secondary storage may be local or networked. Local secondary storage, furnished by storage device 409 on computer system 400, is preferably a random access storage device such as a magnetic or optical disk. Networked secondary storage is provided by storage devices on other computer systems, for example on the host 423 accessible over a local area network 421 or on a server accessible over a wide area network 425 such as the Internet.

While the present invention has been described in connection with a number of embodiments and implementations, the present invention is not so limited but covers various obvious modifications and equivalent arrangements, which fall within the purview of the appended claims.

What is claimed is:

1. A method for managing a pointer in a first memory assigned to an object activated in a second memory having a duration shorter than the first memory, comprising:
   accessing an external reference object, said external reference containing a reference to the pointer in the first memory and a reference to a descriptor for activating the object;
   reactivating the object in the second memory based on the descriptor; and
   reassigning the pointer in the first memory to point to the reactivated object in the second memory based on the reference to the pointer.

2. A method according to claim 1, wherein the reactivated object has a different memory address than that of the activated object.

3. A method according to claim 1, wherein the first memory has a duration that is bounded by a period in which a client has established a connection to a database system.

4. A method according to claim 3, wherein the second memory has a duration within a period in which a database statement is being executed by the database system.

5. A method according to claim 4, further comprising performing the steps of accessing, reactivating, and reassigning at a beginning of execution of the database statement.

6. A method according to claim 4, further comprising:
   deallocating the second memory at an end of executing the database statement; and
   reallocating the call memory at a beginning of a subsequent execution of a database statement before performing the steps of accessing, reactivating, and reassigning.

7. A computer storage medium bearing instructions for managing the pointer, said instructions arranged, upon execution by one or more processors, to perform the method according to claim 1.

8. A method for managing a pointer in a session memory assigned to an object activated in another memory, wherein the other memory has a lifetime that is shorter than the session memory, comprising:
   deallocating the other memory before a beginning of a subsequent database call;

reallocating the other memory; and at the beginning of the subsequent database call, performing the steps of:

reactivating the object in the reallocated call memory; and reassigning the pointer in the session memory to point to the reactivated object in the reallocated call memory.

9. A method according to claim 8, wherein the reactivated object has a different memory address than that of the activated object.

10. A method according to claim 8, wherein the other memory is a call memory.

11. A method according to claim 10, wherein the call memory has a duration within an execution of a database statement by the database system.

12. A method according to claim 8, wherein the session memory has a duration that is bounded by a period in which a client has established a connection to a database system.

13. A method according to claim 8, further comprising:

accessing an external reference object, said external reference object containing a reference to the pointer in the session memory and a reference to a descriptor for activating the object; wherein:

said reactivating the object is based on the descriptor; and said reassigning the pointer is based on the reference to the pointer.

14. A computer storage medium bearing instructions for managing the pointer, said instructions arranged, upon execution by one or more processors, to perform the method according to claim 8.

15. A method for managing a pointer in a session memory to an object in another memory having a duration shorter than that of the session memory, comprising:

within a first database call, performing the steps of:

initializing an external reference object in the session memory, said external reference object containing a reference to the pointer in the session and a reference to the descriptor in the session memory for activating the object;

activating the object in the other memory based on the descriptor; and assigning the pointer in the session memory to point to the activated object in the other memory;

deallocating the other memory, thereby deallocating memory for the activated object in the other memory;

allocating a new other memory; and at a beginning of a second database call subsequent to the first database call, accessing the external reference object to reactivate the object in the new other memory based on the descriptor and reassign the pointer in the session memory to point to the reactivated object in the new other memory based on the reference to the pointer.

16. A computer storage medium bearing instructions for managing the pointer, said instructions arranged, upon execution by one or more processors, to perform the method according to claim 15.

* * * * *

UNITED STATES PATENT AND TRADEMARK OFFICE
CERTIFICATE OF CORRECTION

PATENT NO. : 7,158,995 B2  Page 1 of 1
APPLICATION NO. : 10/406787
DATED : January 2, 2007
INVENTOR(S) : Harlan Sexton et al.

It is certified that error appears in the above-identified patent and that said Letters Patent is hereby corrected as shown below:

COLUMN 10
Claim 1: Line 30, before "containing" please insert --object--.

Signed and Sealed this

Sixth Day of March, 2007

JON W. DUDAS
*Director of the United States Patent and Trademark Office*